United States Patent
Hutchins

(10) Patent No.: US 6,203,040 B1
(45) Date of Patent: Mar. 20, 2001

(54) ADJUSTABLE RUNNING BOARD

(76) Inventor: Paul Hutchins, 11932 King James Ct., Cape Coral, FL (US) 33991

( * ) Notice: Subject to any disclaimer, the term of this patent is extended or adjusted under 35 U.S.C. 154(b) by 0 days.

(21) Appl. No.: 09/311,766

(22) Filed: May 13, 1999

(51) Int. Cl.[7] .................................................. B60R 3/00
(52) U.S. Cl. ............................................ 280/169; 182/90
(58) Field of Search ............................... 280/163, 164.1, 280/169; 182/82, 90, 92; 296/75; 105/443

(56) References Cited

U.S. PATENT DOCUMENTS

| | | |
|---|---|---|
| D. 336,629 | 6/1993 | Hinrichs et al. . |
| D. 349,679 | 8/1994 | Waddington et al. . |
| D. 395,269 | 6/1998 | McCauley, Jr. . |
| D. 397,980 | 9/1998 | Thompson . |
| 2,077,822 * | 4/1937 | Baker .................................. 280/163 |
| 4,203,611 | 5/1980 | Makela . |
| 4,311,320 * | 1/1982 | Waters, Jr. ......................... 280/163 |
| 4,451,063 | 5/1984 | Snyder . |
| 4,456,275 * | 6/1984 | Snyder et al. ..................... 280/163 |
| 4,544,991 | 10/1985 | Gorsuch . |
| 4,557,494 | 12/1985 | Elwell . |
| 4,838,567 | 6/1989 | Michanczyk . |
| 5,193,829 * | 3/1993 | Holloway et al. ................ 280/163 |
| 5,286,049 | 2/1994 | Khan . |
| 5,382,035 | 1/1995 | Waddington et al. . |
| 5,501,475 * | 3/1996 | Bundy ............................... 280/163 |
| 5,713,589 * | 2/1998 | Delgado et al. .................. 280/163 |
| 5,769,439 * | 6/1998 | Thompson ........................ 280/163 |
| 5,823,553 | 10/1998 | Thompson . |

* cited by examiner

*Primary Examiner*—Michael Mar
(74) *Attorney, Agent, or Firm*—Ronald E. Smith; Anton J. Hopen; Smith & Hopen, P.A.

(57) ABSTRACT

An adjustable running board comprising an elongated deck having an integrated first end-cap and an underlying support frame in which clamping bolts may be slideably positioned. The elongated deck may be cut to the length required for installation on a particular vehicle. A mounting shoulder on a second end-cap is bolted to the underlying support frame forming the running board assembly.

6 Claims, 3 Drawing Sheets

ADJUSTABLE RUNNING BOARD

FIELD OF THE INVENTION

The present invention relates generally to vehicle accessories and more particular, to an adjustable running board for sport utility vehicles.

BACKGROUND OF THE INVENTION

This invention is directed to a running board for various cars and sport utility vehicles. The running board is adjustable in length by means of a detachable molded plastic end cap. The end cap is designed to appear non-detachable, but does detach to allow the running boards to be cut to any length to fit most any sport utility vehicle ("SUV"), truck, van or the like. Once the running board has been cut to the desired length, the end cap is re-attached to give the board its finished look.

An object of this invention is to provide an adjustable running board that may fit many different vehicles. The benefit to the installer of these running boards is that they do not have to stock a plurality of different size running boards to service their customers.

Previous attempts have been made to provide novel running boards such as described in U.S. Pat. No. 5,382,035 to Waddington et al. ('035 patent); U.S. Pat. No. 5,286,049 to Khan ('049 patent); U.S. Pat. No. 4,838,567 to Michanczyk ('567 patent); U.S. Pat. No. 4,557,494 to Elwell ('494 patent); U.S. Pat. No. 4,544,991 to Gorsuch ('991 patent); all of which are incorporate herein by reference.

The '035 patent to Waddington et al. describes a multipart running board assembly comprising a longitudinally extending deck overlapped by a decorative overlay. The ends of the deck are overlapped by two end-caps. The perceived benefit of the '035 patent is that the decorative overlay hides the mounting bolts and the end caps prevent dirt and mud from collecting on the running board itself However, the '035 patent does not provide for an adjustable deck. Preset apertures in the deck are used to bolt the end caps on either side. Should the deck in the '035 patent be cut to accommodate a differently dimensioned vehicle, the end-caps could not be secured to the deck. Therefore, the running board in the '035 patent requires prefabrication in different lengths for different vehicles types.

The '049 patent to Khan describes a vehicle running board assembly utilizing vinyl end-caps attached to a metal running board. The perceived novelty of the '049 patent is the use of longitudinally spaced brackets connected between the underside of the deck and the vehicle frame. The mounting method described for securing the end-caps is a pin and post arrangement. However, this arrangement is structurally weak and does not provide a one-piece appearance to the running board itself.

The '567 patent to Michanczyk describes a running board for vehicles having a plurality of mounting bars attached to the vehicle's frame and a cantilever system for supporting the structure. The patent also describes a vertical cover panel for illumination of the platform. The running board of the '567 is not adjustable to varying length vehicles.

The '494 patent to Elwell describes a running board having a series of lighting elements disposed within a cavity on the outside end of the running board. However, the running board of the '494 patent may not be adjusted to the varying lengths of different vehicles.

The '991 patent to Gorsuch describes a lighted running board having quick-change clips whereby burned-out lights may be quickly replaced. The running board of the '991 patent may not be adjusted to the varying lengths of different vehicles.

Consequently, there is a need in the art for an aesthetically pleasing running board that may be adjusted to fit different vehicles yet possesses good structural integrity.

There is a further need in the art for an adjustable length running board that may be lighted on one or both ends for added safety and improved appearance.

There is a further need in the art for a one-size-fits-all running board that may be manufactured in volume cycles thereby lowering the per unit cost to the manufacturer, reseller and the consumer.

However, in view of the prior art in at the time the present invention was made, it was not obvious to those of ordinary skill in the pertinent art how the identified needs could be fulfilled.

SUMMARY OF THE INVENTION

The present invention solves significant problems in the art by providing an adjustable running board that is aesthetically pleasing and structurally sound.

Generally described, the present invention comprises an elongated deck having an underlying rigid support frame secured to the bottom of the deck. An overlying sheath is secured to the top of the deck and integrally forms a substantially vertically disposed, upwardly extending kickplate and an integrated first end-cap structure on one end of the deck. The kickplate is juxtaposed against the side wall of the vehicle below the vehicle's side doors. As the elongated deck is comprised of a single structure including the support frame, the overlying sheath, and the integrated first end-cap, the length of the deck may be adjusted by cutting off a predetermined length distal to the integrated first end-cap. The cut may be performed with a hacksaw, circular saw, or the like to adjust the length of the elongated deck in order to fit various types of vehicles.

A plurality of downwardly open mounting channels in the support frame extend along the full length of the support frame and are unobstructed along the entire length of the support frame. An in-turned lower lip along the mounting channels restricts the opening and provides a support ledge upon which a flat-sided clamping bolt is slideably carried.

A detachable second end-cap structure is fashioned to engage the elongated deck distal to the first end-cap is provided wherein a mounting shoulder extending from the second end-cap underlies the support frame and is rigidly secured by passing the clamping bolt through an aperture in the mounting shoulder and screwably engaging the clamping bolt with a locking nut. In a preferred embodiment, a washer axially receives the clamping bolt and is disposed between the locking nut and the mounting shoulder. Lighting fixtures may be integrated into the first end-cap and the second end-cap in order to illuminate the elongated deck or the side of the vehicle. In an alternative embodiment of the invention, both the first and second end-caps may be detachable.

As an alternative to, or in conjunction with, the apertures in the mounting shoulder, one or more clamping notches in the mounting shoulder may be constructed. The clamping notches are dimensioned to receive the clamping bolt in a sideways rather than axial fashion, over which the washer and the locking nut are engaged to secure the mounting shoulder to the support frame.

As an additional support feature, a flared support flange may be provided. The support flange extends substantially vertical from the mounting shoulder in complementary alignment with the kickplate. In a preferred embodiment, a longitudinally disposed alignment channel in the support frame opens downwardly and slideably mates with a longitudinally disposed alignment ridge in the mounting shoulder. This permits the second end-cap and the elongated deck to be lined up correctly and for minor adjustments to be performed on the overall length of the board before the clamping bolts are tightened. To prevent slipping and enhance user-safety, a plurality of longitudinally extending non-skid rips disposed of the top surface of the elongated deck may be added.

To improve stability and structural integrity, a flat mounting bracket may be used to secure the mounting shoulder to the support frame. The flat mounting bracket has apertures which receive the clamping bolt and are secured by the locking nut. The mounting bracket performs the same function as the washer, but provides added stability to the apparatus.

It is preferred that the adjustable running board be fashioned of weather-resistant, durable materials such as aluminum for the support frame and polymer for the end-caps and elongated deck.

Accordingly, it is an object of the present invention to provide an aesthetically pleasing running board that may be adjusted to fit different vehicles yet possesses good structural integrity.

It is another object of the present invention to provide an adjustable length running board that may be lighted on one or both ends for added safety and improved appearance.

It is another object of the present invention to provide a one-size-fits-all running board that may be manufactured in volume cycles thereby lowering the per unit cost to the manufacturer, reseller and the consumer.

An advantage of the invention is that unlike typical molded running boards which are not adjustable and need to be molded in different lengths to fit different vehicles, the present invention can be adjusted to fit many types of vehicles.

Another advantage of the invention is that running board installers are not required to stock a large number of different sized running boards to service their consumers.

Another advantage of the invention is that the running board manufacturers do not require multiple molds which only vary in length to accommodate differently sized vehicles. Rather, manufacturers can produce a large volume run of a long running board mold, whether by injection mold, fiberglass, vacuuming mold forming or any other suitable process, knowing that the end product may be shorted by the installer to accommodate different vehicles.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
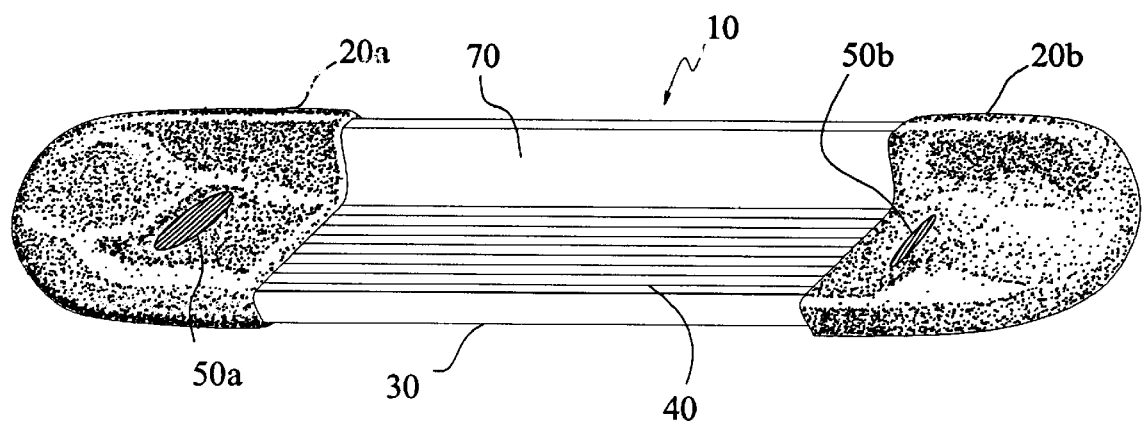
FIG. 1 is a perspective view of a preferred embodiment of the running board according to the invention.

Referring initially to FIG. 1, it will there be seen that an illustrative embodiment of the present invention is denoted by the reference number 10 as a whole. An elongated deck 30 is formed from a longitudinally extending sheath of material 70 integrally forming a substantially vertically disposed upwardly extending kickplate. The material is preferably plastic, but may be fiberglass, metal or other suitable material. An integrated first end-cap 20b on one end of the deck 30 and the deck 30 itself is preferably formed from a single mold process. A plurality of longitudinally extending non-skid ribs 40 are disposed on the top surface of the deck 30 to prevent users from slipping entering or exiting from the vehicle. The ribs 40 may be integrally formed during the molding process or may be layered on top of the preformed deck 30. A detachable second end-cap structure 20a is rigidly mounted to the deck 30. Lighting fixtures 50a–b are set flush with the surfaces of the first and second end-caps. Note that said end-caps are angled toward one another. This angled position enables the lighting fixtures to illuminate elongate deck 30.

Figure 2:
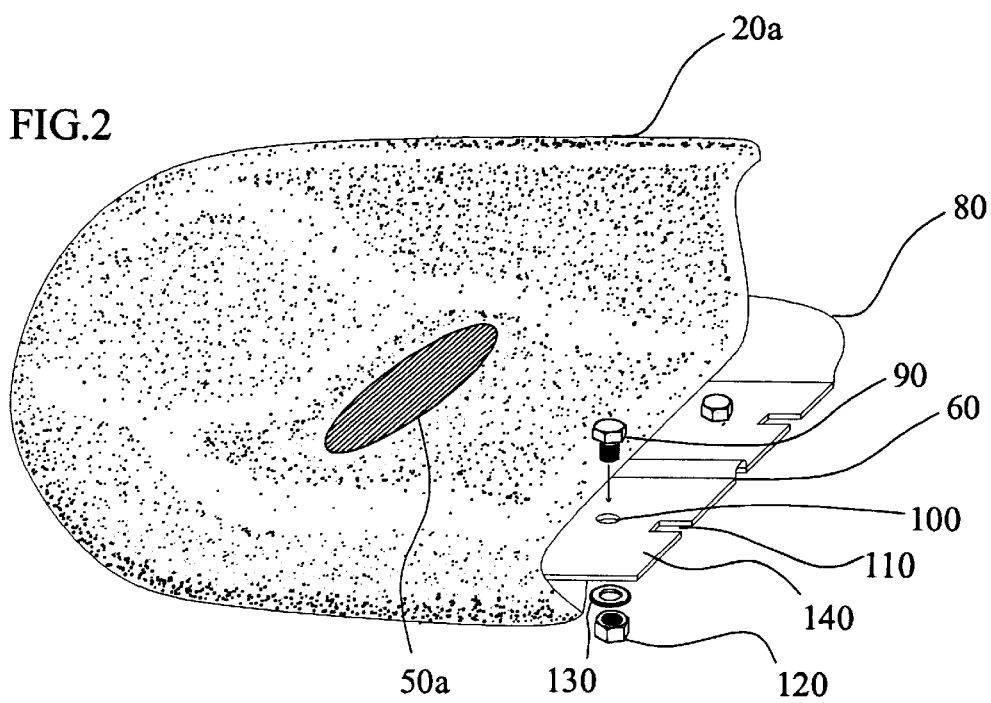
FIG. 2 is a perspective, exploded view of the end-cap assembly according to the invention.
Figure 3:
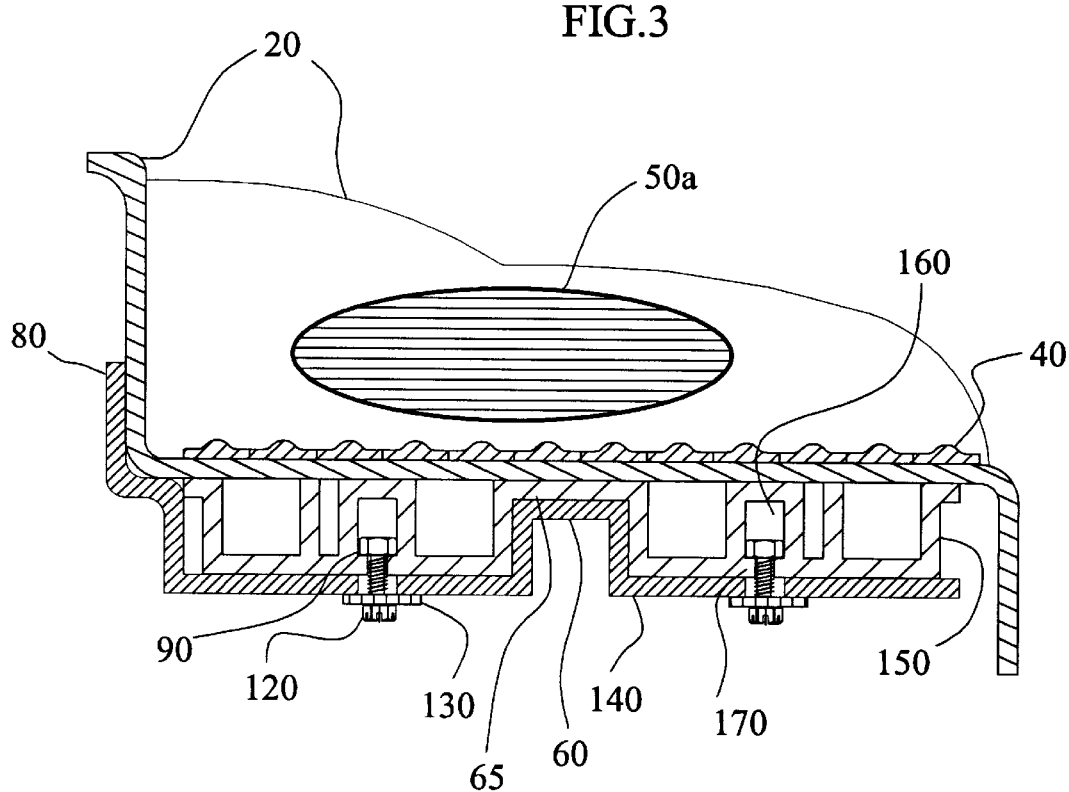
FIG. 3 is a front, cross sectional view of the running board according to the invention.
Figure 4:
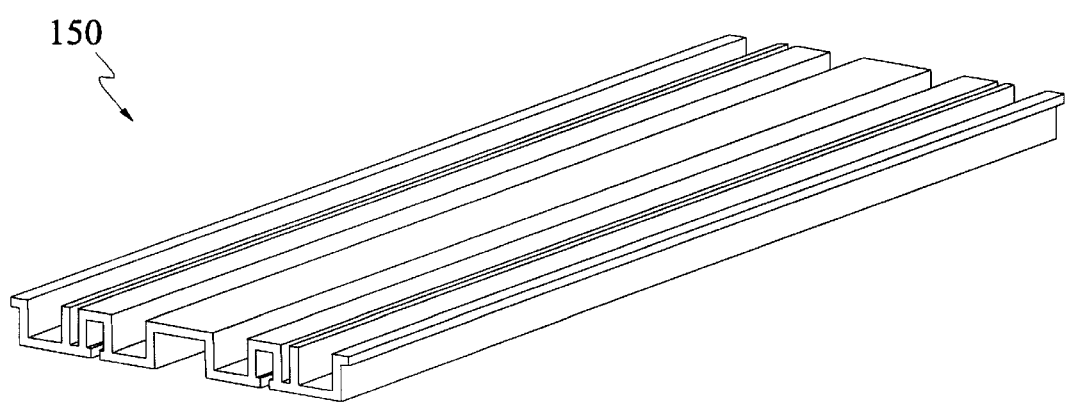
FIG. 4 is a perspective view of the support frame according to the invention.

Referring to FIGS. 2 and 3, a mounting shoulder 140 extends from the underside of the detachable second end-cap 20a to engage a rigid support frame 150 secured to the bottom of the deck 30 and extending substantially the length of the deck 30. It is preferable that the support frame 150 be constructed of a strong, corrosion-resistant material such as aluminum. A plurality of downwardly open mounting channels 160 in the support frame 150 extend along the full length of the support frame 150 and are unobstructed along the length. An in-turned lower lip 170 along the mounting channels 160 restrict the opening and provide a support ledge upon which a flat-sided clamping bolt 90 is slideably carried.

When the elongated deck 30 requires shortening to a predetermined length, the excess length is removed by cutting through the deck 30 and the underlying support frame 150 distal to the first end-cap 20b. Once the excess length is removed, the second end-cap 20a engages the deck 30 distal to the first end-cap 20b wherein the mounting shoulder 140 extending from the second end-cap 20a underlies the support frame 150 and is rigidly secured by passing the clamping bolt 90 through aperture 100 in the mounting shoulder 140 and screwably engaging the clamping bolt 90 with a locking nut 120. In a preferred embodiment, a washer 130 axially receives the clamping bolt 90 and is disposed between the locking nut 120 and the mounting shoulder 140. Before tightening the locking nut 120 towards the mounting shoulder 140, minor adjustments may be made in the length of the running board. During tightening of the locking nut 120, the flat sides of the clamping bolt 90 seat against the sides of the mounting channel 160 thereby preventing the clamping bolt from rotating.

In a preferred embodiment, a flared support flange 80 extends substantially vertical from the mounting shoulder 140 and in complementary alignment with the kickplate 70. The support flange 80 helps provide a tight fit between the second end-cap 20a and the elongated deck 30, thereby contributing to the overall structural integrity. To facilitate the installation of the second end-cap 20a, a longitudinal alignment ridge 60 on the mounting shoulder 140 is received by an alignment channel 65 on the support frame 150. One or more clamping notches 110 may be cut from the mounting shoulder 140 and dimensioned to receive the clamping bolt 90 over which the washer 130 and locking nut 120 are engaged to secure the mounting shoulder 140 to the support frame 150.

Figure 5:
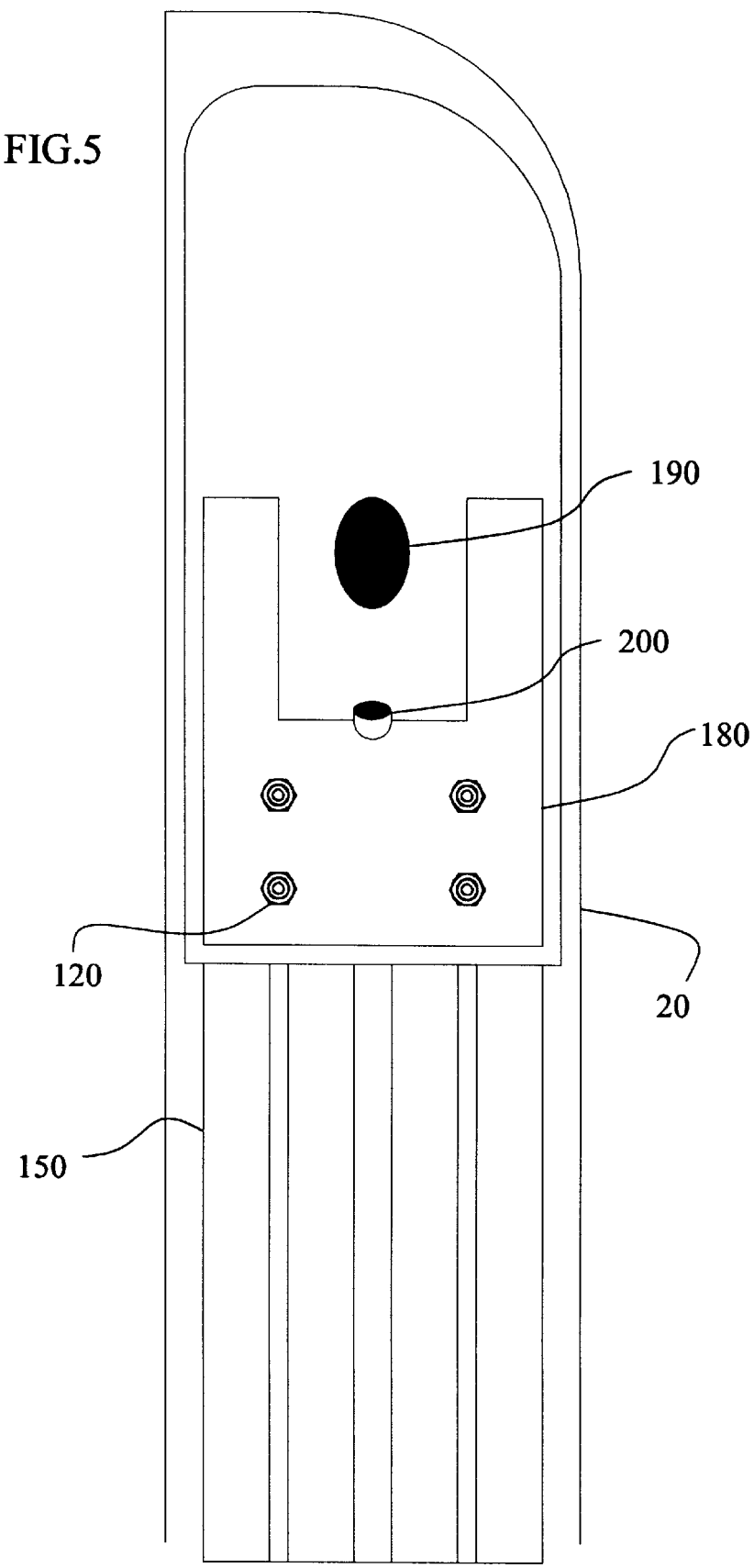
FIG. 5 is a front elevated view of the underside of the running board according to a preferred embodiment of the invention.

FIG. 5 illustrates the underside of the running board wherein a flat mounting bracket 180 is used to secure the mounting shoulder 140 to the support frame 150. The flat mounting bracket 180 has apertures [not shown] which receive the clamping bolt 90 and are secured by the locking nut 120. The mounting bracket 180 performs the same function as the washer 130 of FIG. 2 and FIG. 3, but provides added stability to the apparatus. FIG. 5 also illustrates a light housing aperture 190 which houses the lighting fixtures 50a–b. A wire aperture 200 provides a conduit for providing electricity to the lighting fixtures 50a–b.

It will be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A running board having an adjustable length, comprising:

an elongate deck;

a rigid support frame disposed in underlying relation to said elongate deck;

a first end-cap disposed at a first end of said elongate deck;

said first end-cap being integrally formed with said elongate deck and said rigid support frame;

a second end-cap disposed at a second end of said elongate deck;

said second end-cap being independently formed with respect to said elongate deck and said rigid support frame;

a mounting shoulder disposed in underlying relation to said second end-cap and extending a predetermined distance from thereunder relative to an upper inner edge of said second end-cap;

a longitudinally disposed, downwardly opening alignment channel formed in said rigid support frame, said alignment channel slideably mating with a longitudinally disposed alignment ridge formed in said mounting shoulder, said mounting shoulder adapted to support a second end of said elongate deck and said rigid support frame;

said elongate deck and said rigid support frame being formed of a cuttable material and being cuttable to any preselected length;

said mounting shoulder disposed in underlying, supporting relation to said rigid support frame and hence said elongate deck after said rigid support frame and elongate deck have been cut to a predetermined length;

whereby said second end-cap performs both a decorative function and a structural function; and whereby said second end-cap enables said running board to be cut to any preselected length without loss of aesthetic or structural integrity.

2. The adjustable running board of claim 1, further comprising a first lighting fixture integrated into said first end-cap and a second lighting fixture integrated into said second end-cap.

3. The adjustable running board of claim 2, wherein said first end second end-caps are angled toward one another so that said first and second lighting fixtures illuminate said elongate deck.

4. The adjustable running board of claim 1, further comprising a plurality of longitudinally extending non-skid ribs disposed on the top surface of said elongate deck.

5. The adjustable running board of claim 1, wherein said first end-cap and said second end-cap are formed of vacuum-formed polymer.

6. The adjustable running board of claim 1, wherein said rigid support frame is formed of aluminum.

* * * * *